US011139661B2

(12) United States Patent
Stuart

(10) Patent No.: US 11,139,661 B2
(45) Date of Patent: Oct. 5, 2021

(54) BILEVEL EQUALIZER FOR BATTERY CELL CHARGE MANAGEMENT

(71) Applicant: The University of Toledo, Toledo, OH (US)

(72) Inventor: Thomas A. Stuart, Toledo, OH (US)

(73) Assignee: The University Of Toledo, Toledo, OH (US)

(*) Notice: Subject to any disclaimer, the term of this patent is extended or adjusted under 35 U.S.C. 154(b) by 91 days.

(21) Appl. No.: 16/669,688

(22) Filed: Oct. 31, 2019

(65) Prior Publication Data
US 2020/0185931 A1 Jun. 11, 2020

Related U.S. Application Data

(60) Provisional application No. 62/771,752, filed on Nov. 27, 2018.

(51) Int. Cl.
*H02J 7/00* (2006.01)
*H02J 7/34* (2006.01)

(52) U.S. Cl.
CPC .......... *H02J 7/0014* (2013.01); *H02J 7/0029* (2013.01); *H02J 7/345* (2013.01)

(58) Field of Classification Search
CPC .................................. H02J 7/0014; H02J 7/00
See application file for complete search history.

(56) References Cited

U.S. PATENT DOCUMENTS

| 5,479,083 A * | 12/1995 | Brainard | H01M 10/0413 320/121 |
| 2013/0278218 A1* | 10/2013 | Onnerud | H02J 7/0016 320/118 |
| 2016/0028256 A1* | 1/2016 | Kubota | H02J 7/0014 320/118 |
| 2017/0163160 A1* | 6/2017 | Din | H02J 7/0016 |

* cited by examiner

*Primary Examiner* — Robert Grant
(74) *Attorney, Agent, or Firm* — MacMillan, Sobanski & Todd, LLC

(57) ABSTRACT

An equalizer circuit provides both passive and active cell voltage equalization in a battery pack to improve charge and discharge capacity at a low cost. The equalizer circuit is a bilevel circuit that uses both passive equalizers and active equalizers to balance cell voltage. The cells may be grouped into size limited sections which are balanced by passive equalizers. The sections are balanced by active equalizers to promote increased pack charge and discharge capacity. The equalizer circuit can use a current detector or a voltage controlled oscillator to assist in closed loop current control to reduce switching losses and permit use of smaller transistors. The equalizer circuit can use open line protection with capacitors to store excess charge and prevent voltage overload of the switching devices.

16 Claims, 11 Drawing Sheets

A: Open loop control
B: Closed loop control (a) Voltage controlled oscillator (VCO)

(b) VCO implemented with AEQ Central or Local microcontroller

BILEVEL EQUALIZER FOR BATTERY CELL CHARGE MANAGEMENT

CROSS-REFERENCE TO RELATED APPLICATIONS

This application claims the benefit of U.S. Provisional Application No. 62/771,752 filed Nov. 27, 2018, the disclosure of which is incorporated herein by reference in its entirety.

BACKGROUND

The present disclosure relates in general to battery management systems. In particular, the present disclosure relates to voltage equalizer subsystems, as part of a battery management system, to balance voltages levels among a plurality of battery cells in a battery pack. In one embodiment, the voltage equalizer subsystem described herein is a bilevel equalizer suitable for use in large power battery packs, such as lithium ion batteries (LIB).

Large LIBs have been in use for electric vehicles and various military applications for several years. These batteries have several advantages such as very high energy and power density, long lifetime, and high efficiency, and they can remain at a low state of charge for long periods of time without damage. These features make them attractive for many applications, and large scale production has recently led to large cost reductions. Because of these developments, large LIBs are now being evaluated by electric utilities and government agencies for purposes such as frequency regulation and decreasing grid power variations from wind and solar energy sources. Electric vehicles also take advantage of LIBs.

Large LIB packs may consist of large numbers of cells connected in series or sometimes in series-parallel. For safety and maximum performance, the LIBs rely on a battery management system (BMS) that provides several functions such as voltage monitoring. One basic function of the BMS is to measure the voltage of each cell and to provide an equalizer (EQU) that maintains all the cell voltages close to the same level. LIBs, and other types of high power density, high energy density batteries such as lithium sulfur, sodium ion, and others currently under development, are sensitive to the voltage levels of individual cells. As these cells age, individual variations in their structure become more prevalent and influential in the cell's ability to accept and output charge. For instance, the cell's charge capacity (amp hours, AH) decreases and its series resistance increases. Additionally, not all cells in a battery age at the same rate, so eventually wide variations in cell strength and performance develop over time. The resulting output and performance of the battery pack, made up of these many individual cells, is limited by the weakest cell or cells. Therefore, these cells also determine the usable capacity and lifetime of the pack.

For lithium ion battery architectures, at full charge the maximum allowable cell voltage is typically about 4.2 V, and the minimum allowable is about 2.8 V at full discharge. Charging is halted when the highest voltage cell reaches 4.2V, and discharge is halted when the lowest cell reaches 2.8 V. Thus, in order to improve efficiency and safety of these batteries, EQUs prevent overcharging and excessive discharge of weak cells by balancing the cell voltages. Weaker cells will charge and discharge faster than the other cells because their lower capacity and higher resistance will cause them to reach their voltage limits sooner. Therefore, EQUs are used to remove charge from these weaker cells during charge to allow more time for the other cells to charge. Some EQUs also add charge to the weaker cells during discharge to allow more time for the other cells to discharge.

There are two broad types of EQUs: Resistive or Passive equalizers (PEQ) and Switching, Transfer, or Active equalizers (AEQ). PEQs remove charge from the higher voltages by connecting resistors in parallel with the higher voltage cells to divert current. Their main purpose is to compensate for differences in cell self-discharge current. This method of charge equalization, however, is inefficient and of no use during discharge since PEQs cannot add charge to a cell.

Instead of dissipating energy, AEQs use high frequency switching circuits to transfer charge from weaker to strong cells during charge cycles, and vice versa during discharge cycles. There are a wide variety of types, with certain designs having an efficiency in the range of about 98-99%. However, in spite of their advantages, AEQs are not widely used since they are more complex and expensive than PEQs.

In general, present EQUs such as PEQs have high losses and do nothing to compensate for losses in discharge capacity, while others such as the AEQs are too expensive for most applications. Thus, it would be desirable to improve both the efficiency and cost of the BMSs and the EQUs.

SUMMARY OF THE INVENTION

The present disclosure relates in general to battery charge management systems. In particular, the present disclosure relates to charge equalizer subsystems, as part of a battery management system, to balance charge levels among a plurality of battery cells in a battery pack.

The charge equalizer subsystem provided herein is a bilevel equalizer suitable for use in large power battery packs, such as lithium ion batteries (LIB).

In one embodiment, a bilevel equalizer for battery voltage management includes:

a plurality of cells configured to be connected together to form a battery pack, where the plurality of cells are divided into at least first and second sections of cells;

at least two passive equalizers where each passive equalizer is connected to each of the plurality of cells in a one-to-one relationship within the at least first and second sections of cells; and an active equalizer connected between the at least first and second sections of cells. The active equalizer includes an open line protection system.

The active equalizer and the open line protection system comprise a plurality of capacitors and a plurality of control circuits.

At least one the plurality of capacitors stores energy in the event an open circuit forms to prevent voltage overload of the at least one of the plurality of control circuits.

In certain embodiments, the active equalizer comprises a first subunit and a second subunit.

The first subunit includes: a first subcircuit comprising a first switching device, a first inductor, and a first capacitor. The first subcircuit is connected in parallel to a second subcircuit, where the second subcircuit comprises the first section of cells.

The second subunit includes: a third subcircuit comprising a second switching device, the first inductor, and a second capacitor. The third subcircuit is connected in parallel to a fourth subcircuit, wherein the fourth subcircuit comprises the second section of cells. The first inductor is in electrical communication with the first subcircuit and the third subcircuit.

In certain embodiments, the first capacitor is connected in parallel with the first section of cells and the second capacitor is connected in parallel with the second section of cells.

In certain embodiments, the bilevel equalizer further includes a driver that provides a drive signal to the first and second control circuits.

In certain embodiments, the open line protection system directs the driver to cycle on and off so that the total voltage across the capacitors is kept from exceeding the specified operating tolerances of the first and second switching devices thereby preventing voltage overload.

In certain embodiments, the control circuit comprises a field effect transistor.

In certain embodiments, the control circuits comprise a transistor and a diode element.

In certain embodiments, the bilevel equalizer further includes a closed loop current controller, where a first current is used as feedback in the closed loop current controller to provide a signal to a driver that drives the plurality of control circuits.

In certain embodiments, the closed loop current control comprises a voltage controlled oscillator (VCO).

In certain embodiments, the VCO is implemented by using a separate circuit or by adding code to an active equalizer (AEQ) microcontroller.

In another embodiment, a bilevel equalizer for battery voltage management includes:

a plurality of cells configured to be connected together to form a battery pack, where the plurality of cells are divided into at least first and second sections of cells;

at least two passive equalizers where each passive equalizer is connected to each of the plurality of cells in a one-to-one relationship within the at least first and second sections of cells;

an active equalizer connected between the at least two sections, where the active equalizer comprises a plurality of switching devices and a first inductor having a first current;

at least one first current monitor to detect the first current; and a closed loop current controller where the first current is used as feedback in the closed loop current controller to provide a signal to a driver that drives the plurality of switching devices.

In certain embodiments, the at least one current monitor is a differential pair current sensor.

In certain embodiments, the first current is compared to a reference current to calculate a difference signal and the difference signal is used to drive the driver.

In certain embodiments, the bilevel equalizer further includes an open line protection system.

In certain embodiments, the open line protection system further comprises a plurality of capacitors, where at least one the plurality of capacitors stores energy in the event an open circuit forms to prevent voltage overload of at least one of the plurality of switching devices.

In certain embodiments, the switching devices comprise a transistor and a diode element.

Various aspects of the present disclosure will become apparent to those skilled in the art from the following detailed description of the preferred embodiments, when read in light of the accompanying drawings.

BRIEF DESCRIPTION OF THE DRAWINGS

FIG. 13A Voltage controlled oscillator (VCO); and, FIG. 13B: VCO implemented with AEQ Central or Local microcontroller.

DETAILED DESCRIPTION

Figure 1:
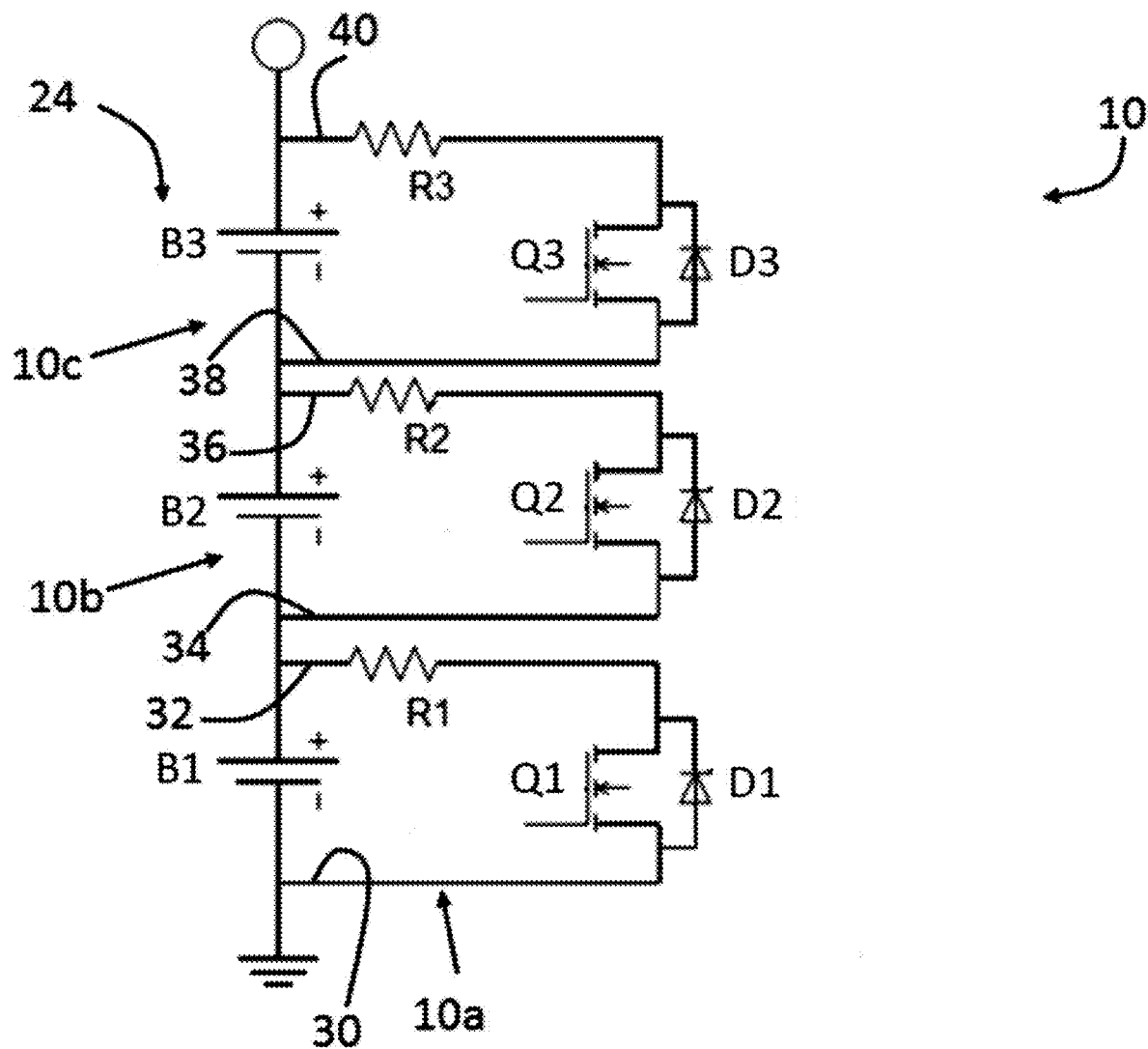
FIG. 1: Schematic diagram of a Resistive Equalizer circuit in accordance with the present disclosure.

Referring now to the drawings, there is illustrated in FIG. 1 a schematic diagram of a Passive Equalizer (PEQ), shown generally at 10 and in the context of a three-cell pack. As will be described below, the PEQ 10 forms a portion of a Battery Management System (BMS) for controlling cell charge levels in a battery pack, such as for example a LIB. The PEQ 10 comprises three individual resistive equalizer circuits 10a, 10b, and 10c connected to three battery cells B1, B2, and B3 forming a battery pack 24. It should be understood that the PEQ and other equalizer circuits (i.e., PEQ, AEQ, BEQ) described herein may be used in conjunction with cells B1, B2, B3, etc. of any size, number, and chemical architecture. The PEQ 10 includes resistors R1, R2, and R3. The PEQ 10 further includes switching devices Q1, Q2, and Q3. The switching devices Q1, Q2, and Q3 may include transistor and diode elements, though the diode elements are not required components. The diode components are identified as D1, D2, and D3. The switching devices Q1, Q2, and Q3 can be field effect transistors (FETs). Each individual PEQ sub-circuit includes an electrical connection completing the sub-circuit around each cell B1, B2, and B3. For example, the cell level sub-circuit for cell B1 includes electrical connection 30, shown between a negative side of cell B1 and the switching device Q1. Electrical connection 32, which includes resistor R1, is connected between the switching device Q1 and the positive side of cell B1. Similarly, electrical connections 34 and 36 complete a circuit between cell B2 and switching device Q2, and electrical connections 38 and 40 complete a circuit between cell B3 and switching device Q3.

To illustrate the operation of the PEQ 10, assume cell B3 has the lowest voltage of all the cells during the charge cycle. During charge, field effect transistors (FETs) Q1 and Q2 are energized to connect resistors R1 and R2 across cells B1 and B2 until all three cell voltages are equal. The FETs Q1, Q2 act as low resistance switches. Although PEQs can equalize the cell voltages, the battery pack discharge capacity is still limited by the weakest cell. For example, assume the AH capacities for cells B1, B2, and B3 are fifty AH, thirty AH, and sixty AH, respectively, and that all are fully charged. If the pack 24 of FIG. 1 is discharged at ten amps, B2 will be fully discharged in three hours, but B1 will still have twenty AH and B3 will have thirty AH, respectively, of charge output remaining. In spite of their discharge limitations and low efficiency, PEQs are simple and cheap, and therefore they are the most widely used type of EQU. It should be understood, as mentioned above, that other charge equalizing circuits may be substituted for the PEQ 10 and remain within the scope of the present disclosure.

Figure 2:
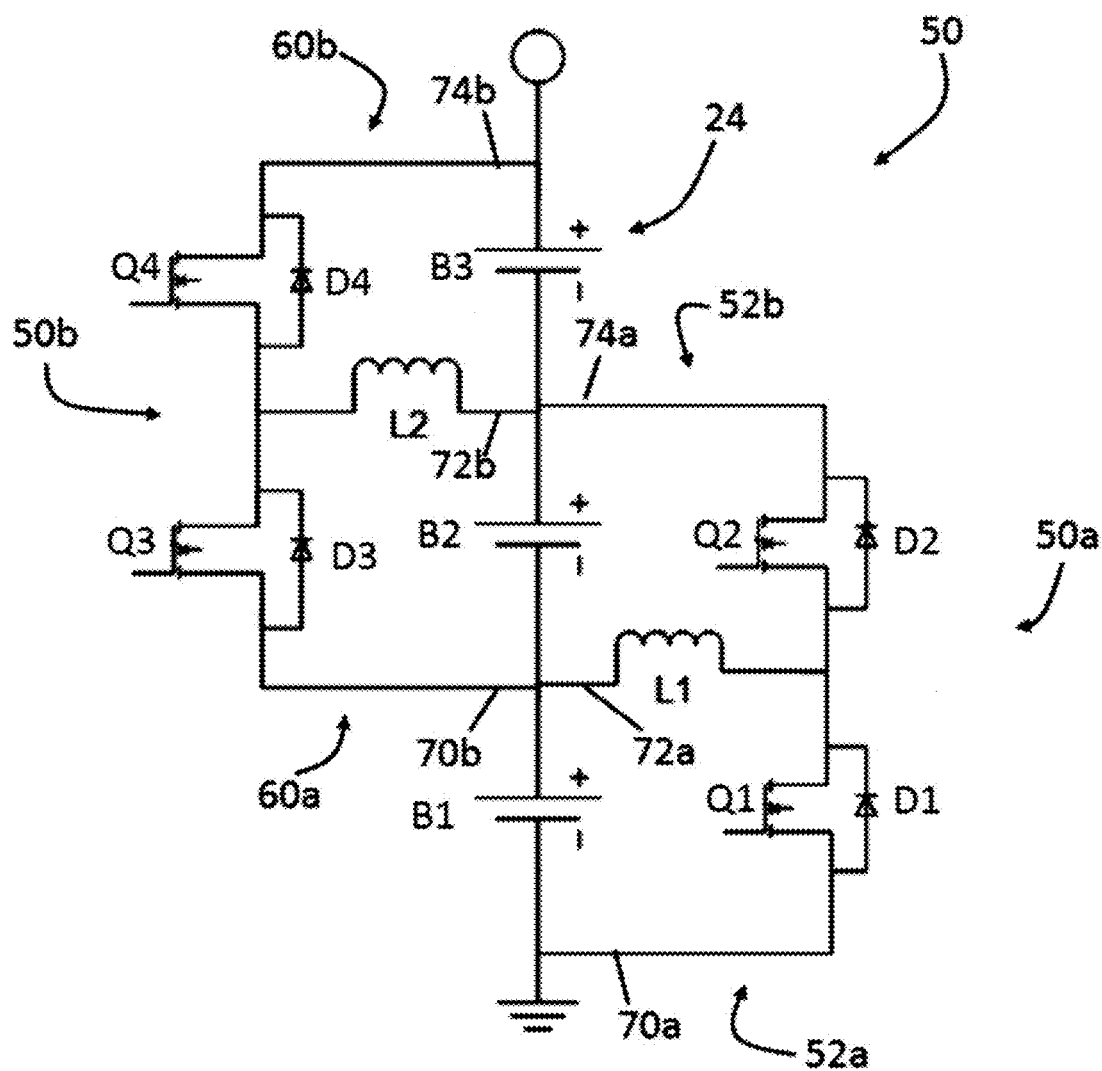
FIG. 2: Schematic diagram of a Switched Equalizer circuit in accordance with the present disclosure.

Referring now to FIG. 2, there is illustrated a schematic diagram of an embodiment of an Active Equalizer (AEQ) circuit, shown generally at 50, for the three-cell pack 24 shown in FIG. 1.

As will be further described below, the AEQ circuit 50 forms a portion of a Battery Management System (BMS) for controlling cell charge levels in a battery pack, such as for example a LIB. Though shown as a simple AEQ circuit, it should be understood that any form or variation of AEQ may be used. This circuit has some similarity to the common DC-DC boost converter which is known for high efficiency.

The AEQ subunit 50 is illustrated as two AEQ subunits 50a and 50b, though any number of subunits may be combined to form the AEQ 50. The typical number of subunits may be a function of the number of battery cells to be equalized. Each subunit AEQ 50a and 50b includes a similar complement of components, but will be described in detailed operation in the context of AEQ subunit 50a.

The first subunit AEQ 50a is illustrated having a first circuit loop 52a having a switching device Q1 comprising a transistor with a diode D1 and a second circuit loop 52b having a switching device Q2 comprising a transistor with a diode D2. Similar to the PEQ circuit 10, above, the switching device Q1 of the first AEQ subunit 50a includes a diode D1 and a FET. The switching device Q2 also includes a diode D2 and a FET. For the FETs, the transistor and the diode can be combined in a single device, but they are shown separately in FIG. 2 to describe their operation.

The first AEQ subunit 50a has electrical connection 70a between the negative side of cell B1 and the switching device Q1 and electrical connection 72a that includes an inductor L1 between the switching device Q1 and the positive side of cell B1. The second circuit loop 52b includes an electrical connection 74a between the positive side of cell B2 and shares the electrical connection 72a. Each of the first and second circuit loops 52a and 52b include the commonly connected inductor L1.

The second AEQ subunit 50b includes a third circuit loop 60a and a fourth circuit loop 60b. The third circuit loop 60a includes a switching device Q3 comprising a FET and a diode D3. The fourth circuit loop 60b is similarly configured and includes a switching device Q4 comprising a FET with a diode D4. Each of the third and fourth circuit loops 60a and 60b include a commonly connected inductor L2. The second AEQ subunit 50b includes electrical connections 70b, 72b, and 74b that are similar to those connections of the first AEQ subunit 50a.

In one embodiment, the switching devices (e.g., Q1, Q2, Q3, Q4, etc.) of the AEQ 50 may be sized at about one hundred volts and about sixty Amps. The inductor L1 may be in a size range of about fifty micro-henries ($\mu$H). In one embodiment, the size of the inductor current may be reduced by utilizing FETs that switch at a relatively high frequency, such as 4-40 kHz. It should be understood that the rating size of the AEQ and PEQ components, in accordance with the present disclosure, may be sized in conjunction with the desired battery pack or cell grouping outputs.

To illustrate operation of the AEQ subunits, as shown in FIG. 2, assume cells B1 and B2 are charged to different voltage levels, such that cell B1 has a higher voltage level than cell B2. When the charge level is being balanced between cells B1 and B2, for example, on a first half cycle of operation, the FET of switching device Q1 is turned on and current flows from cell B1 to the inductor L1. On a second half cycle, the FET of switching device Q1 turns off, and the current in inductor L1 flows through the diode D2 of the adjacent FET of switching device Q2 and into the adjacent cell B2. From the example, when switching device Q1 is the only active FET, charge will be transferred from target cell B1 to target cell B2. When switching device Q2 is the only active FET, charge is transferred from cell B2 to cell B1. It should be understood that the two target cells do not have to be adjacent to each other. When the target cells (those to be balanced) are positioned away from each other, charge is transferred via the cells between the two target cells. For example, from FIG. 2, if switching device Q2 and switching device Q4 are the only active FETs, charge is transferred from cell B3 via cell B2 to cell B1. This switching action continues until the voltages of the two target cells are equal.

Since AEQs assist during both charge and discharge cycles and have high efficiency, they can provide much higher pack capacity. This is because the pack discharge capacity is now about the same as the average capacity of all of the cells, instead of the capacity being governed by the weakest cell as with the PEQ. This can be seen from the following numerical example for FIG. 2. As in the previous example, assume that cells B1 to B3 are fully charged at fifty AH, thirty AH, and sixty AH, respectively, and the pack is discharged at ten amps. If "x" is the equalization current sent to cell B2 from cell B1, and "y" is the current sent from cell B3, then, $(10-x-y)t=30$, for $B2$, where $t$=discharge time $(10+x)t=50$, for $B1$ $(10+y)t=60$, for $B3$ Solving these equations yields:

$t$=4.67 hours, $x$=0.714 A, $y$=2.857 A, and discharge capacity=46.7AH which is also the average capacity of the pack.

Recall that the capacity for the same example with a PEQ was only 30 AH.

As can be seen from the above, the conventional use of PEQs or AEQs as stand-alone equalizers is not satisfactory for applications that are cost sensitive and require maximum capacity over a long lifetime. It has been found that combinations of PEQs and AEQs, as sub-circuits of a Bilevel Equalizer (BEQ), shown generally at 100 in FIG. 3, can provide performance comparable to that of an AEQ, and at a cost that is in the range of a PEQ. The essence of the BEQ is that it divides the battery into sections of series connected cells. The BEQ 100 presents an efficient system that can provide a very significant increase in battery capacity and at a reasonable cost. This system also can be used with other types of batteries such as lithium sulfur, sodium ion, and others currently under development.

Figure 3:
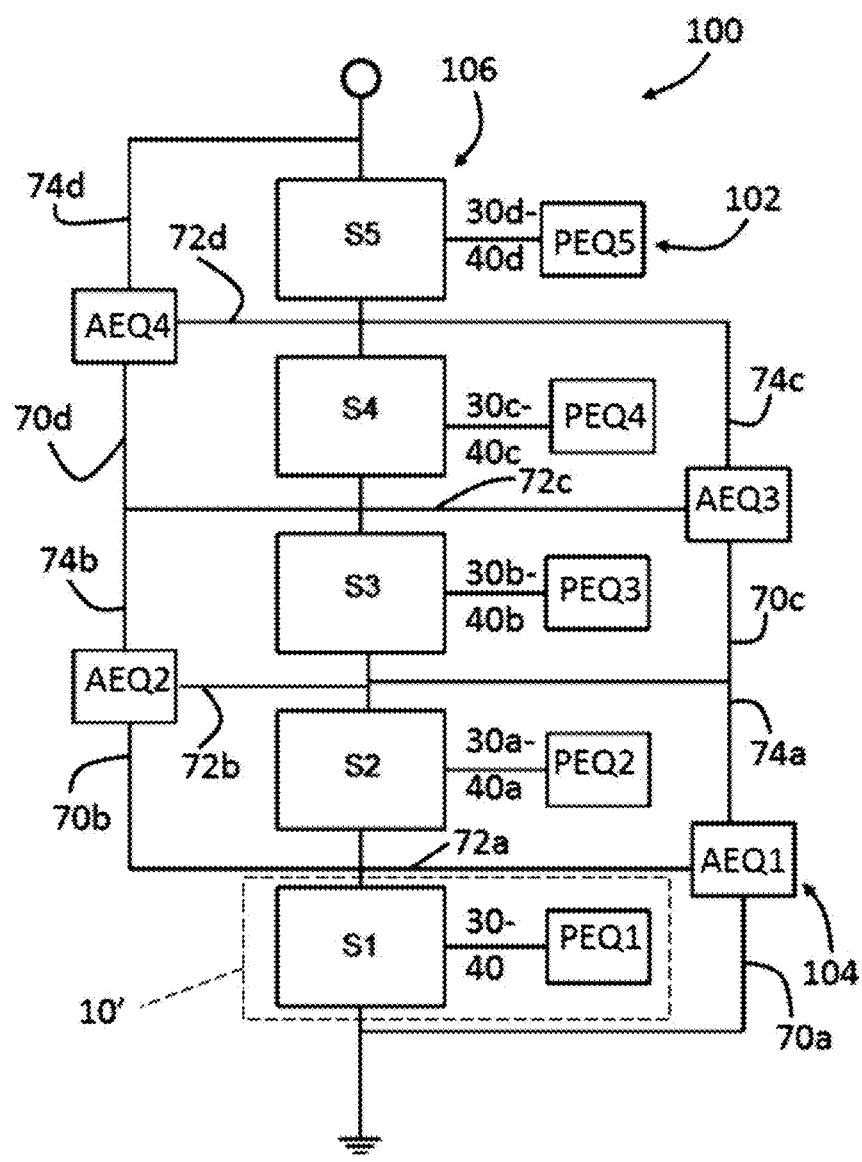
FIG. 3: Schematic diagram of a Bilevel Equalizer circuit in accordance with the present disclosure.

The embodiment of the BEQ 100 shown in FIG. 3, includes a set of PEQs 102, similar to PEQ 10 which are augmented with AEQs 104, similar to AEQ 50. The battery pack, connected to the BEQ 100, includes cells similar to the cells B1-B3, described above. In one embodiment, the BEQ 100 is configured to work with large battery packs that consist of many cells such as, for example, 100 cells or more. It should be understood that any number of cells B1, B2, B3, etc. may be connected to form the battery pack in conjunction with BEQ 100. In the system shown in FIG. 3, the pack is not altered, but it is organized into 5 sections or "super cells", shown generally at 106 and labeled as sections S1, S2, S3, S4, and S5. In one embodiment, each cell section S1-S5 may consist of 4-8 cells, such as B1-B4 or B1-B8. The cell sections 106, however, may include more or fewer cells B1-Bn than the range of 4-8 cells, if desired. The BEQ 100 has two basic equalization parts: a primary equalizing circuit defined by each of the set of PEQs 102, which equalize the cell voltages within each section (instead of the entire pack), and a secondary equalizing circuit defined by the AEQs 104, which equalize the section voltages of sections 106. The number of AEQ units 104 can be represented by taking the number of sections 106 and subtracting 1. Thus, FIG. 3 has 5 sections (S1, S2, S3, S4, and S5), and five minus 1 equals 4 AEQs (AEQ1, AEQ2, AEQ3, and AEQ4) 104.

The BEQ 100 provides equalization at two different voltage levels. Each of the PEQs only equalizes cells in a single cell section 106. Thus, the problem of one or two weak cells dragging down the voltages of all cells in the battery pack is avoided. For example, if four-cell sections are used, a weak cell will only drag down the other three cells in the same section. As shown in FIG. 3, the PEQs, for example PEQ1, is connected to the section S1 in a manner similar to the connections of PEQ 10 of FIG. 1. As shown by way of example in FIG. 3, S1 includes three cells in an arrangement similar to the PEQ 10 of FIG. 1. As such, the connection between S1 and PEQ1 of FIG. 3 is designated as 10' and includes the electrical connections 30-40 of FIG. 1. Similarly, the connections of the other sections S2-S5 and PEQs 2-5 are constructed in a similar manner.

The AEQ simultaneously equalizes the section voltages in a non-dissipative manner. Integrated circuits, such as the Linear Technology LTC6804, are examples of suitable substitute active circuits for the PEQs, and these reduce cost while providing the PEQ control, cell voltage measurement, and communication with the BMS.

As described above, the numerical example of AEQ operation for three cells shows that the magnitude of the equalizing current can be an impacting consideration. To be effective, this current should be large enough to equalize the cells at an adequate rate during both charge and discharge. If the current is too low, the charge or discharge limit may be reached before the cells have equalized, reducing the usable battery capacity. Higher current levels reduce cost efficiencies, since larger and more expensive components are typically needed. Another advantage of the BEQ 100 over a pure AEQ is that fewer AEQ units can be used in the BEQ 100, which can lower the overall cost or offset the costs of higher power units.

In many embodiments, large packs may contain several cell sections, such as the five-section example in FIG. 3. This means there can be several AEQ charge transfers taking place simultaneously between various sections. A computer algorithm can determine these transfers. This algorithm is based on the measured maximum and minimum cell voltages in each of the sections.

In operation of one embodiment, the BEQ 100 may utilize the PEQs associated with each of the cell sections during charging events only, since PEQs are of no benefit during discharge, though such is not required. It should be noted that the charging current is often much higher than the discharge current, so the extra assistance provided by these PEQ units during charging can be of significant benefit and provide additional cost efficiencies. One example of this is electric vehicle "fast charging" where the battery pack is charged in 30 to 60 minutes but discharged over several hours.

The charge/discharge strategies of one embodiment of the BEQ 100, described above, provide several advantages. Since the AEQs may be used during discharge, the discharge capacity will be close to the average of the section capacities. This is a significant improvement over a pure PEQ, where the discharge capacity is only equal to that of the weakest cell in the entire pack.

Regardless of which circuit is used to perform the primary equalizing circuit function of the PEQs 102, which is to equalize the cell voltages within the section, the AEQs 104 equalize the section voltages. The PEQ 102 circuit operates by using resistors to drain charge from the cells until all cell voltages in the section equal the lowest cell voltage. An active substitute operates by transferring charge from the higher voltage cells to the lower voltage cells, thus improving efficiency but adding cost.

Although the passive PEQs 10 of the BEQ embodiment shown in FIG. 3 provide a cost effective solution, the PEQs 10 of the BEQ 100 may be replaced by or augmented with active circuit equalizers, such as the AEQs 50 or bi-directional DC to DC converters. For example, substitution of the PEQs 10 for devices, such as an EM1401EVM made by Texas Instruments, can actively equalize up to 14 cell voltages within a section. Another example is the LTC3300-1 made by Linear Technology, which can actively equalize up to 12 cell voltages within a section. Both of these examples use bi-directional DC to DC converters to transfer charge between each of the individual cells and the stack of all the series-connected cells in the section. Regardless of whether the cells within a section are equalized by a passive or an active circuit, the functionality of the BEQ 100 in FIG. series3 will be same since the same type of AEQs 104 can be used to equalize the section voltages.

An experiment based in part on the BEQ 100 of FIG. 3 was conducted with (12) 50 AH GAIA cobalt oxide LIB cells that were chosen at random from a group that was about 8 years old. These cells had been used in various lab experiments, and although the number of charge/discharge cycles was limited, their previous operating history had not been recorded. The BEQ for this experiment used three sections with four cells each. One charge/discharge test was run with a pure PEQ and another was run with the BEQ. The discharge capacity of the BEQ test was about 14% higher than that for the PEQ test. Generally, as batteries exhibit larger cell variations (by design, cycling, or age), the improvement in performance of the BEQ over the PEQ will also be much higher.

The BEQ 100 hybrid disclosed in FIG. 3 is an improvement over the other EQUs such as the AEQ or the PEQ. However, the BEQ can be improved in terms of reliability, weak cell detection, efficiency, and cost.

Figure 4:
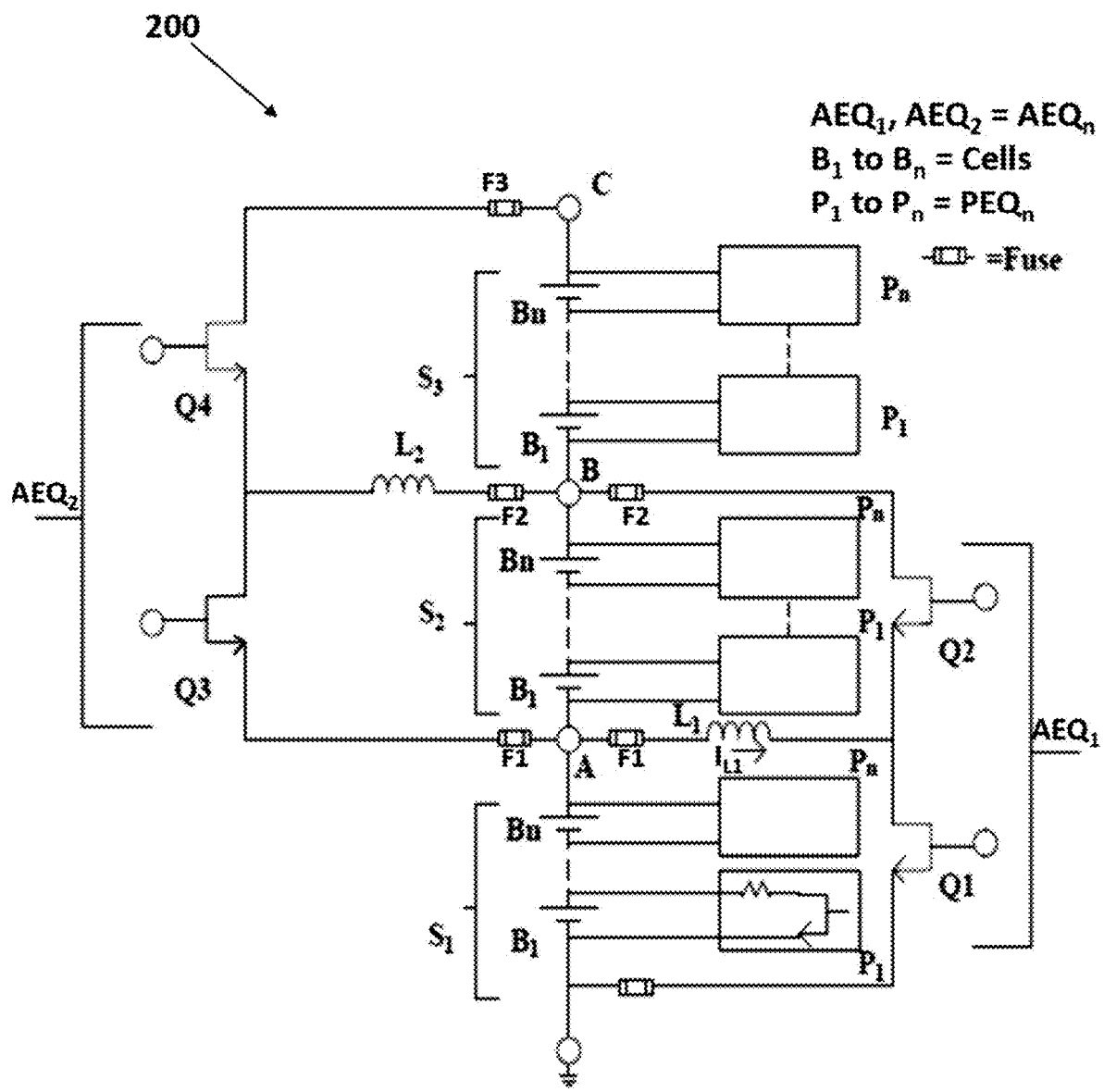
FIG. 4: Schematic diagram of a basic Bilevel Equalizer circuit for three sections of cells, S1-S3.

Referring now to FIG. 4, there is illustrated a schematic diagram of a BEQ circuit 200 having two AEQ units, $AEQ_1$ and $AEQ_2$, and three sections of cells S1-S3. Each section S1-S3 contains a number of cells $B_1$-$B_n$. The BEQ circuit 200 has fuses F1, F2, and F3 located proximate to points A, B, and C, respectively. The BEQ circuit 200 also has switching devices Q1-Q4 which can include diode elements to conduct current in a reverse direction. The switching devices Q1-Q4 can be transistors, such as FETs.

In the BEQ 200 shown in FIG. 4, energy is stored in the inductor L1 as the switching device Q1 conducts with current $I_{L1}$ flowing through the inductor L1. When the switching device Q1 reaches a peak current, the switching device Q1 is turned off, and the inductor L1 transfers current $I_{L1}$ to section S2. This charge transfer technique is referred to as "pump and dump."

Now, assume for example that the top fuse F2 by point B opens while the switching device Q1 conducts. When the switching device Q1 turns off, an open circuit is created that prevents current flow from the inductor L1 to S2 of the BEQ circuit 200. As a result, a high voltage is built across the inductor L1. The voltage across the inductor L1 can reach a level that exceeds the voltage tolerance of the switching device Q1. This can lead to voltage overload of the switching device Q1 which can damage the switching device Q1. If a switching device in a BEQ circuit is damaged, the performance of the BEQ circuit is negatively affected. Thus, a BEQ's reliability can be affected if one of the fused lines to the battery opens while the BEQ circuit is operating.

Figure 5:
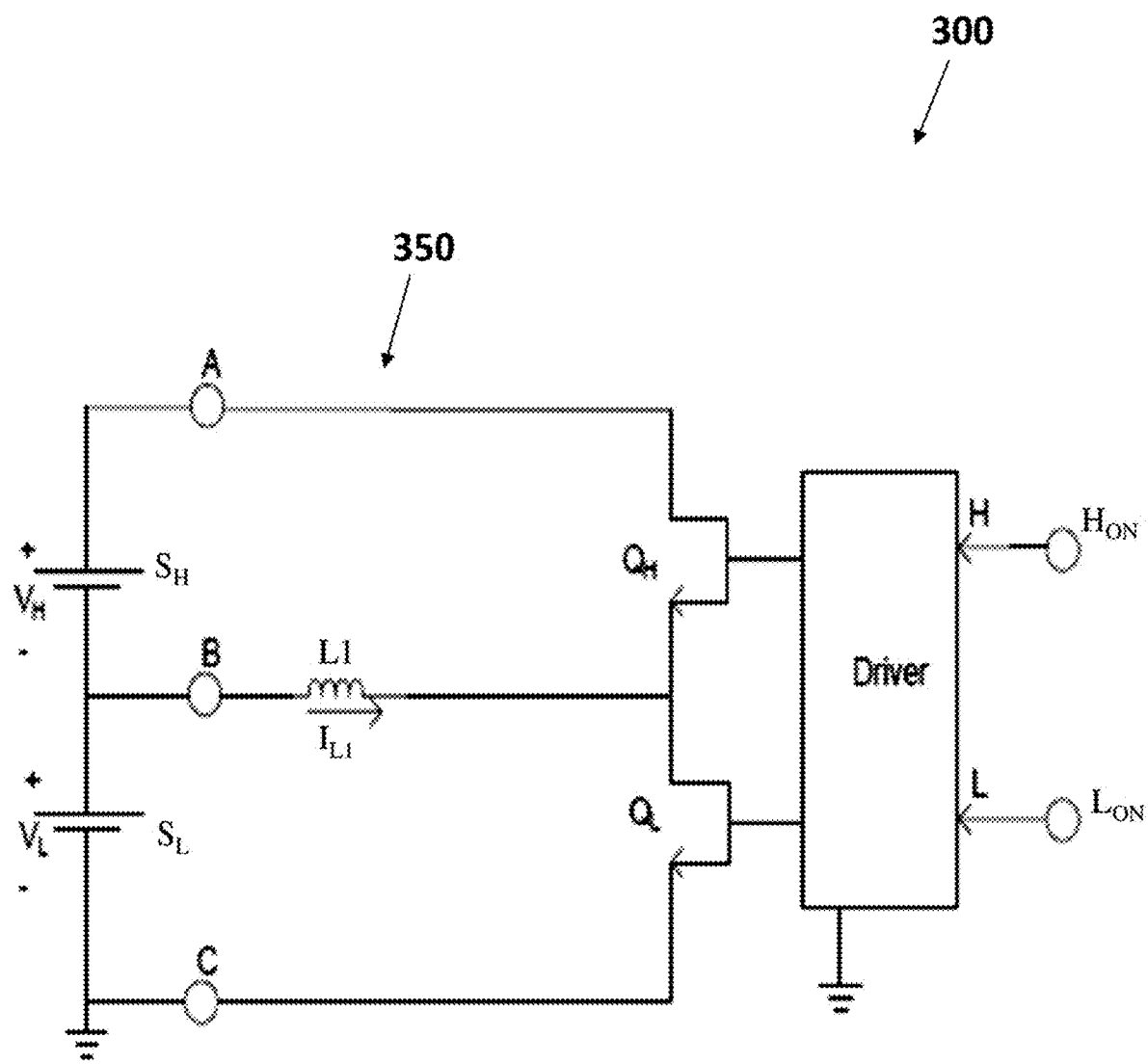
FIG. 5: Schematic diagram of the active (AEQ) unit of a Bilevel Equalizer Driver circuit

Referring now to FIG. 5, there is illustrated a schematic diagram of the AEQ unit 350 of a BEQ circuit 300. The AEQ unit 350 is the portion of the BEQ circuit 300 that is responsible for transferring charge from one section of the battery to another. In the BEQ circuit 300 shown in FIG. 5, the AEQ unit 350 transfers charge between sections $S_L$ and $S_H$ by switching the switching devices $Q_L$ and $Q_H$. The switching devices $Q_L$ and $Q_H$ can be FETs and can include diode elements.

The AEQ unit 350 can be damaged if one of the lines connected to section $S_L$ or $S_H$ opens while the BEQ circuit 300 is in operation. For example, assume the connection at point A in FIG. 5 opens while the switching device $Q_L$ is conducting. Then, when the switching device $Q_L$ turns off, an open circuit is created that prevents current flow from the inductor L1 to section $S_H$. As a result, a high voltage is built across the inductor L1 because section $S_H$ is no longer available to accept the energy stored in the inductor L1. The voltage across the inductor L1 can reach a level that exceeds the voltage rating (i.e., breakdown voltage) of the switching device $Q_L$. This can lead to voltage overload of the switching device $Q_L$ which can damage the switching device $Q_L$ and affect the overall performance of the BEQ circuit 300.

A similar result occurs if the connection at point C in FIG. 5 opens while the switching device $Q_H$ is conducting. Then, when the switching device $Q_H$ turns off, an open circuit is created that prevents current flow from the inductor L1 to section $S_L$. As a result, a high voltage is built across the inductor L1 because section $S_L$ is no longer available to accept the energy stored in the inductor L1. The voltage across the inductor L1 can reach a level that exceeds the voltage rating (i.e., breakdown voltage) of the switching device $Q_H$. This can lead to voltage overload of the switching device $Q_H$ which can damage the switching device $Q_H$ and affect the overall performance of the BEQ circuit 300.

A potential solution to this problem is to implement an open line (or fuse) protection circuit that protects the active portion (i.e., AEQ portion) of the BEQ circuit if any of the lines connecting to the battery are opened. The open line protection circuit should protect the switching devices from a voltage overload scenario.

Figure 6:
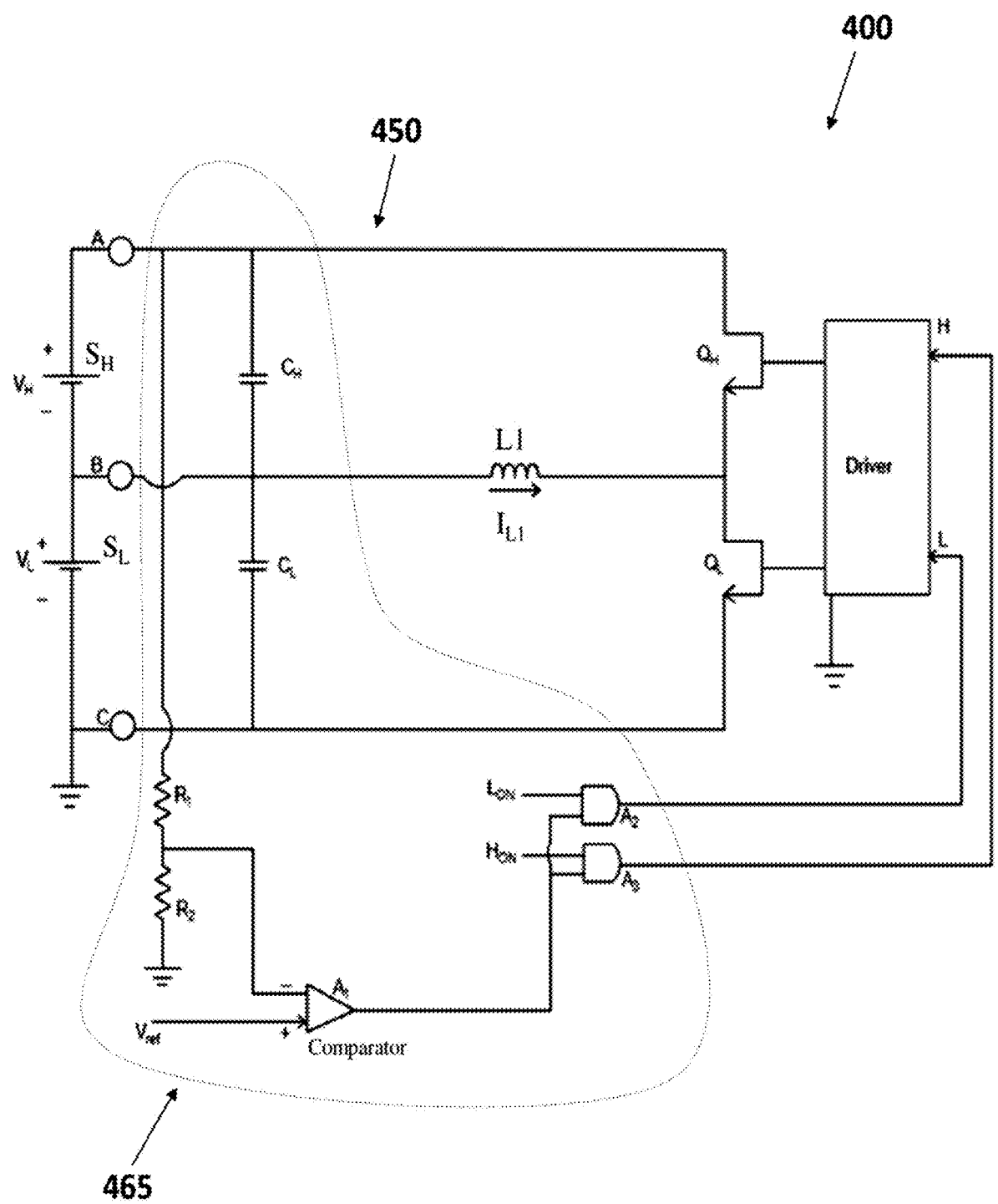
FIG. 6: Schematic diagram of the AEQ unit of a Bilevel Equalizer Driver circuit with open line (or fuse) protection.
Figure 7:
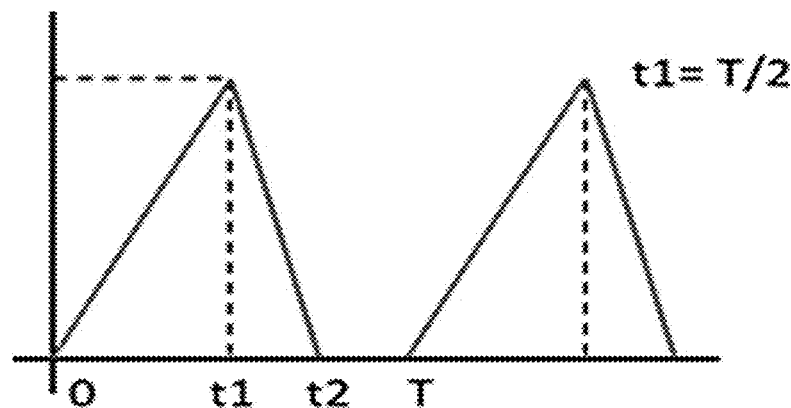
FIG. 7: Graph of the inductor current waveform for a Bilevel Equalizer Driver circuit with open loop current control.

Referring now to FIG. 6, there is illustrated a schematic diagram of an AEQ unit 450 of a BEQ driver circuit 400 with open line protection 465. To illustrate how the BEQ driver circuit 400 with open line protection 465 works, assume the connection at point A opens while the switching device $Q_L$ is conducting. Then, when the switching device $Q_L$ turns off, a capacitor $C_H$ stores the charge from the inductor current $I_{L1}$ pulse at a safe voltage level. But, if the switching device $Q_L$ continues switching, the voltage across the capacitor $C_H$ continues building so the capacitor $C_H$ should be large enough to store energy for multiple switching cycles. Nevertheless, the voltage across the capacitor $C_H$ eventually exceeds a fixed limit slightly above the voltage $V_H$ and the total voltage across the series connected capacitors $C_H$ and $C_L$ exceeds a designated voltage limit.

In FIG. 6, the protection circuit 465 senses when the total voltage across the series connected capacitors $C_H$ and $C_L$ is too high and takes steps to protect the BEQ circuit 400. For example, if the total voltage across the series connected capacitors $C_H$ and $C_L$ exceeds the designated voltage limit, then the voltage at the (−) input to the comparator A1 exceeds the reference voltage $V_{ref}$ at the (+) input to the comparator A1. This causes the protection circuit 465 to turn off both of the driver input signals L and H. Eventually the voltage across the capacitor $C_H$ decays, allowing the switching device $Q_L$ to produce more inductor current $I_{L1}$ pulses. The protection circuit 465 directs the BEQ driver circuit 400 to cycle on and off in this manner so that the total voltage across the series connected capacitors $C_H$ and $C_L$ is kept from exceeding the specified operating tolerances of the switching devices $Q_H$ and $Q_L$ thereby preventing voltage overload. This is often referred to as "bang-bang control."

Figure 9:
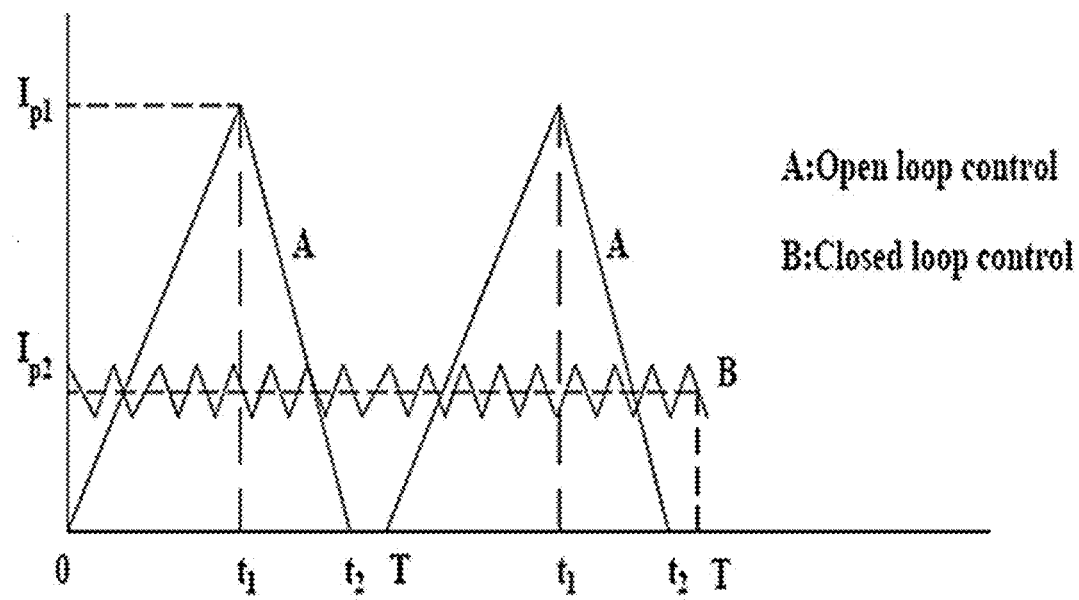
FIG. 9: Graph comparing the inductor current waveform for a Bilevel Equalizer circuit with open loop current control and a Bilevel Equalizer circuit with closed loop current control.

Referring back to FIG. 5, there is shown the AEQ unit 350 of a BEQ circuit 300 with open loop current control. To illustrate the operation of the BEQ circuit 300 with open loop current control assume the switching device $Q_L$ is turned on (i.e., conducting). As shown in FIG. 9, when the switching device $Q_L$ conducts, the current $I_{L1}$ flows from section $S_L$ and reaches a peak current $I_{p1}$ at time t1, at which time the switching device $Q_L$ is turned off (i.e., not conducting). The current $I_{L1}$ then flows through the body diode of the switching device $Q_H$ and into section $S_H$. In this manner, charge is transferred from battery section $S_L$ to battery section $S_H$ and the process is repeated until the desired amount of charge has been transferred. The switching device $Q_H$ is switched in a similar manner to transfer charge from battery section $S_H$ to battery section $S_L$.

Figure 8:
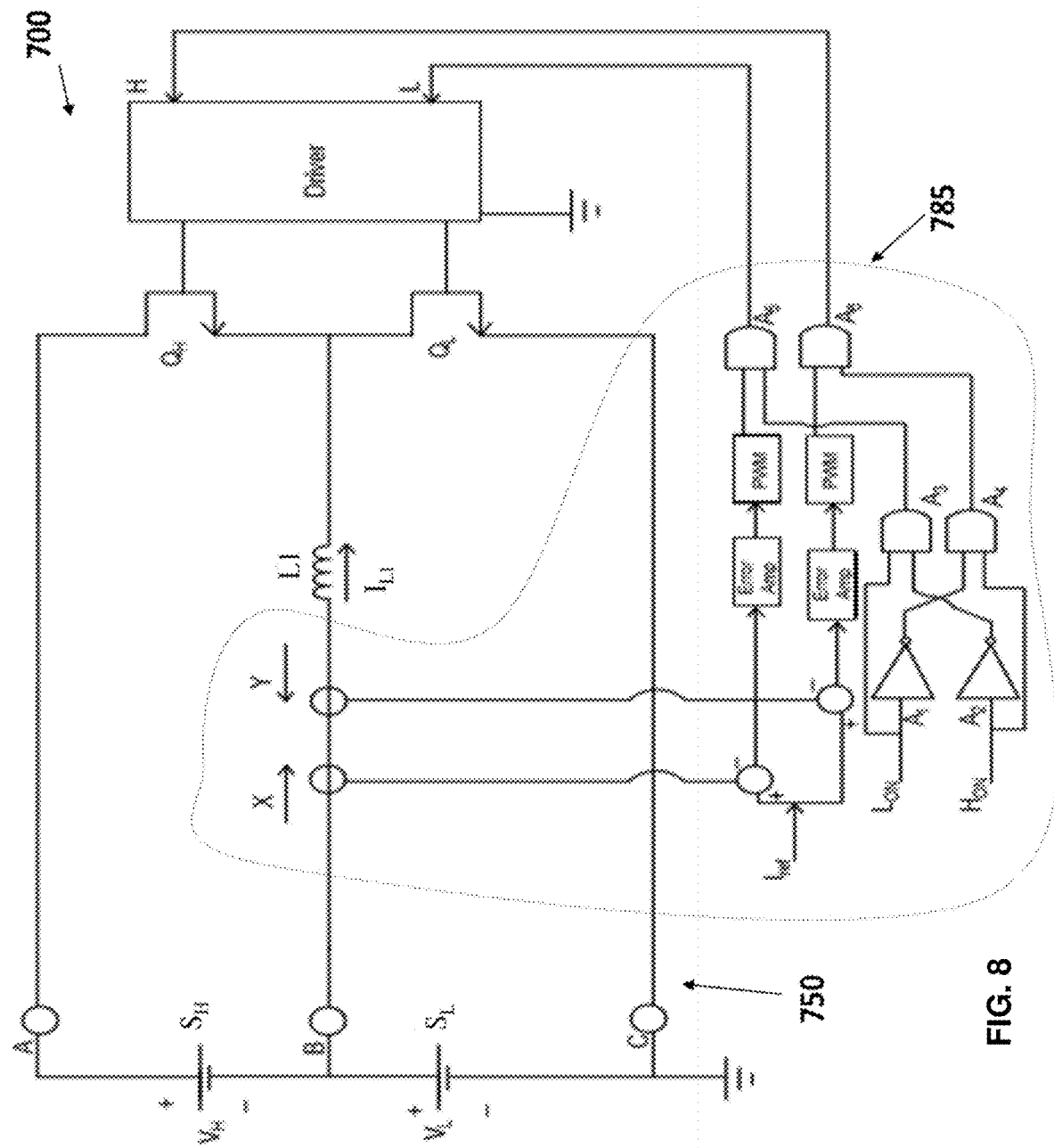
FIG. 8: Schematic diagram of the AEQ unit of a Bilevel Equalizer Driver circuit with closed loop current control.

FIG. 8 shows a schematic diagram of the active (AEQ) portion 750 of a BEQ circuit 700 with closed loop current control 785. The BEQ circuit 700 with closed loop current control 785 has DC current monitors, X and Y, that sense the DC value of the inductor current $I_{L1}$ and compare the inductor current $I_{L1}$ to the reference current $I_{ref}$. If the signal $L_{ON}$ is active, the current $I_{L1}$ is positive and the monitor X is active. If the signal $H_{ON}$ is active, the current $I_{L1}$ is negative and the monitor Y is active. A difference signal, represented by $I_{ref}$-$I_{L1}$, is then amplified and converted to a pulse width modulated (PWM) control signal. The external signals $L_{ON}$ and $H_{ON}$ applied to the A1-A4 logic device circuitry enables logic devices A5 or A6 to gate a high frequency PWM signal to produce either the H or L driver input signal to drive the switching device $Q_H$ or $Q_L$.

A BEQ circuit 700 with closed loop current control 785 can be used to equalize the voltages of sections of cells in large lithium ion batteries (LIBs). The BEQ 700 with closed loop current control 785 provides higher reliability and efficiency than a BEQ 300 with open loop current control. For a BEQ 300 with open loop current control, the amplitude of the current is unregulated and varies directly with the battery section voltage which can vary by +/−20%. For a BEQ 700 with closed loop current control 785, the amplitude of the current is regulated and remains almost constant at the value determined by $I_{ref}$.

Referring now to FIG. 9, there is a graph comparing the inductor current $I_{L1}$ waveforms for a BEQ circuit 300 with open loop current control (waveform A) and a BEQ circuit 700 with closed loop current control 785 (waveform B). The BEQ circuit 300 with open loop current control, represented by waveform A in FIG. 9, has a high peak inductor current $I_{p1}$ which causes high losses in the inductor L1, and high conduction loss in the BEQ circuit 300 due to the high AC current in a BEQ circuit 300 with open loop current control.

The BEQ circuit 700 with closed loop current control 785 avoids the high peak inductor current $I_{p1}$ of an open loop current controller. The closed loop current control 785 represented by waveform B has a much lower peak inductor current value $I_{p2}$ and AC harmonic content. For example, the peak inductor current $I_{p1}$ in open loop current control (waveform A) can equal three times the peak inductor current $I_{p2}$ in closed loop current control (waveform B). In FIG. 9, the inductor current $I_{L1}$ for closed loop current control 785, represented by waveform B, has a much lower peak-to-average ratio of about 1.1:1 than the inductor current $I_{L1}$ for open loop current control, represented by waveform A, which has a peak-to-average ratio of about 3:1. Lower peaks signify much lower losses in the inductor L1 and less heat generation.

Figure 10:
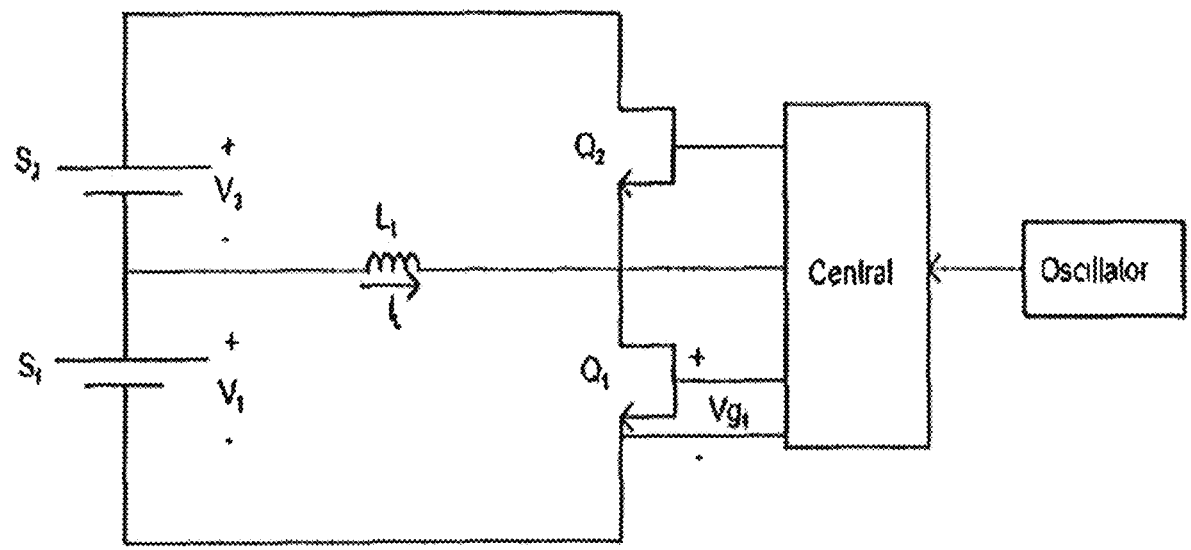
FIG. 10: Schematic illustration of Open loop (OL) AEQ Driver with fixed frequency oscillator.
Figure 11:
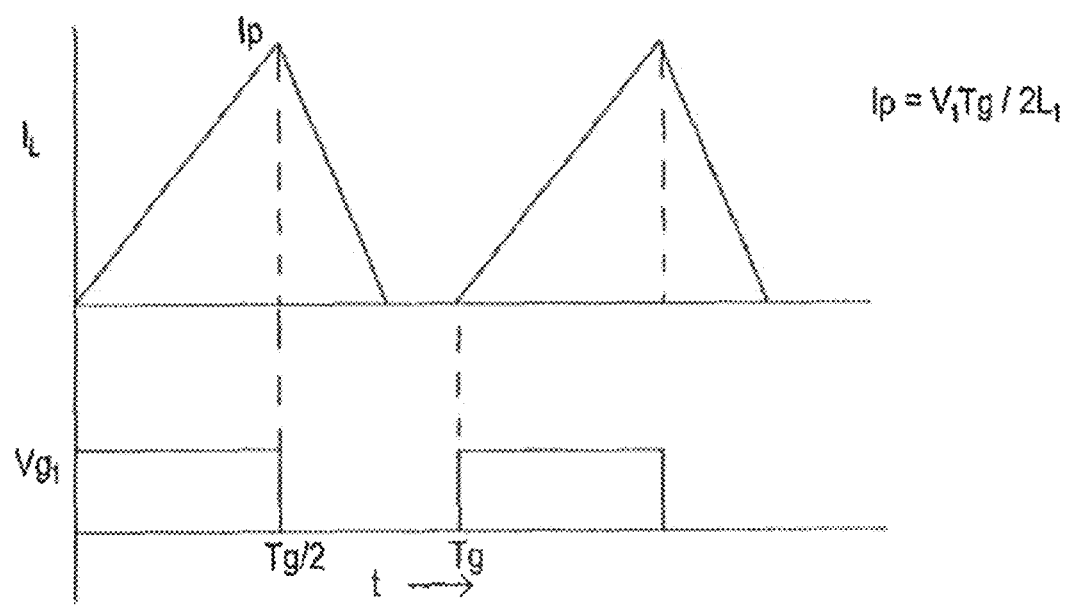
FIG. 11: Graph of 1 L and Vg1 for energy transfer from 51 to 52 in FIG. 10.
Figure 12:
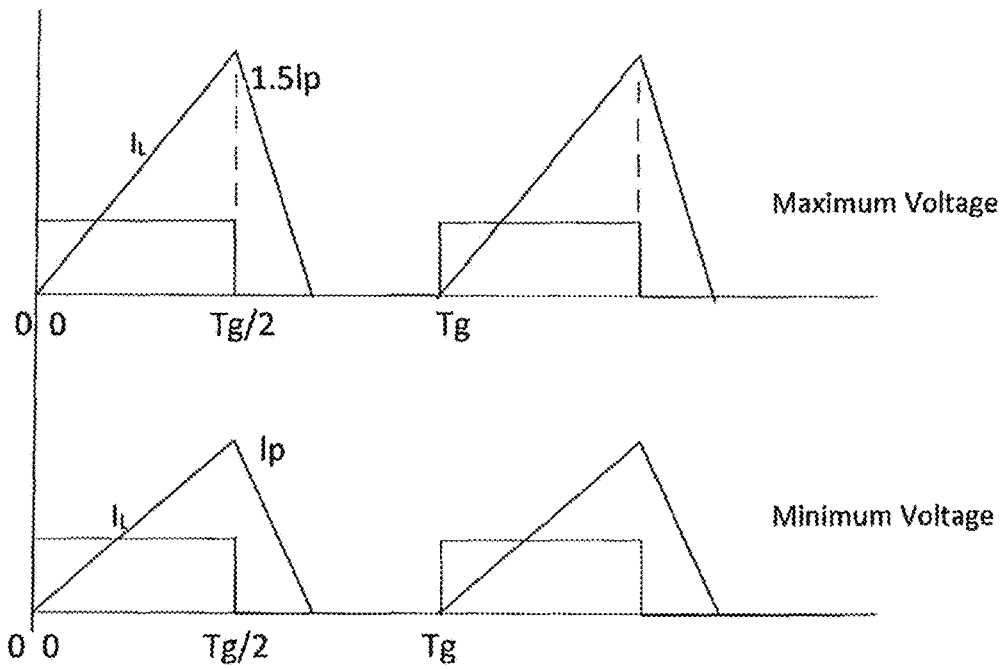
FIG. 12: Graph of inductor current, 1 L, and FET gate drive, Vg, for a constant frequency, 1 L is unregulated and varies with cell voltage.

The circuit in FIG. 8 regulates 1 L by sensing 1 L and varying the duty cycle of the fixed frequency Q1 and Q2 gate drive signal, Vg. However, 1 L also can be regulated by varying the frequency of Vg in proportion to the section voltage instead of sensing IL. The original AEQ circuit (similar to FIG. 5) is shown in FIG. 10, and waveforms for QL operation are shown in FIG. 11. A fixed frequency was used for the Q1 gate drive voltage, Vg. This is called an open loop control (OL) driver because the inductor current, 1 L, is unregulated, and it varies with the S2 and S2 voltages, V1 and V2. The cell voltages that compose VL and V2 vary from 2.8 Vdc at full discharge to 4.2 Vdc at full charge. This means V1, V2, and IL will increase by 50% during a full charge cycle. For a constant FET gate drive frequency, Fg=1/Tg, FIG. 12 shows the variation in IL as the cell voltages vary from the minimum to the maximum. L1, QL, and Q2 must be designed for the maximum value of IL at 4.2 Vdc, which is 50% above the minimum value that occurs at 2.8 Vdc.

Figure 13A:
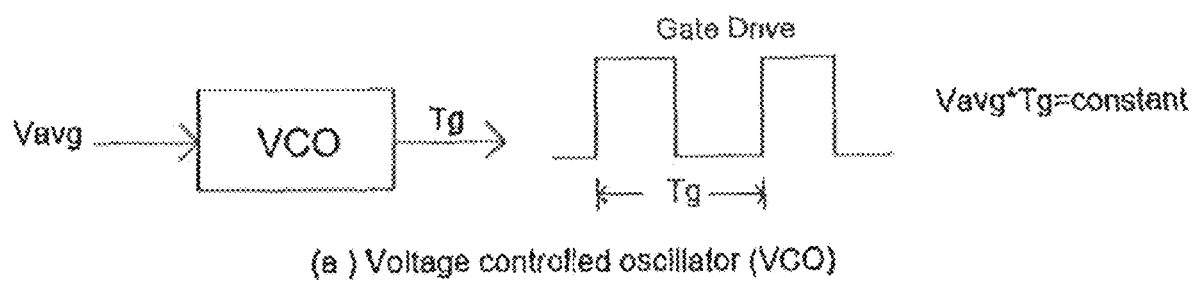
FIGS. 13A-13B: Schematic diagrams of voltage controlled oscillator (VCO) to regulate 1 L as the cell and section voltages vary.

FIG. 13A shows the block diagram of a Voltage Controlled Oscillator (VCO) circuit that decreases the period of the gate drive signal, Tg, as the average of the section voltages, Vavg, increases. This is done so that Vavg× Tg=constant, To a good approximation, Vavg=V1=V2 in FIG. 10, so V1×Tg=V2×Tg=constant. IL is directly proportional to V1×Tg/2 or V2×Tg/2, so the peak and average values of 1 L also will remain constant. The VCO can be implemented with a separate circuit, but the preferred implementation is to use one of the microcontrollers in the AEQ control circuit, as in FIG. 13B.

Figure 13B:
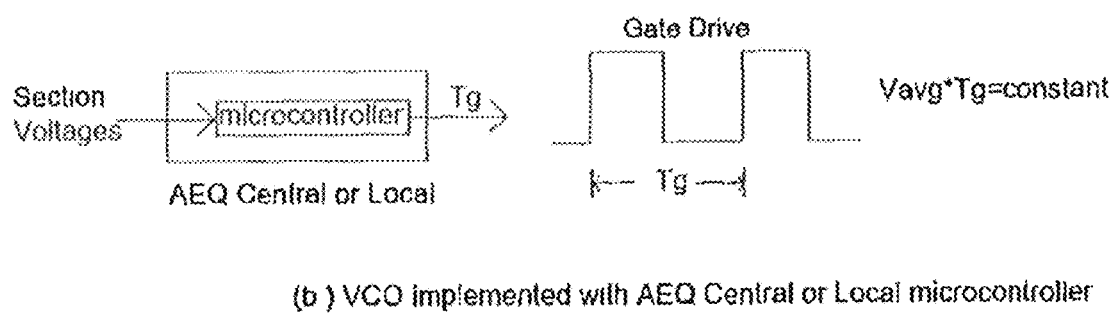

Since these microcontrollers are already present, FIG. 13B minimizes the number of components and is actually much simpler to implement than a separate VCO circuit.

Figure 14:
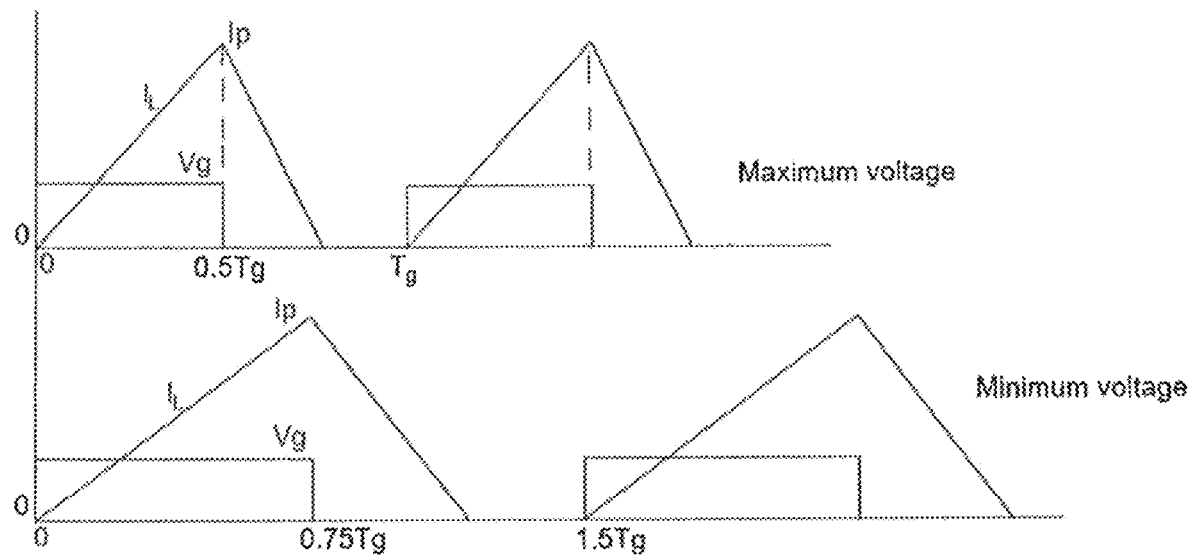
FIG. 14: Graph of inductor current, 1 L, and FET gate drive, Vg, using a VCO. The peak and average values of 1 L remain constant as the cell voltage varies.

When using the VCO, FIG. 14 shows how Vg and 1 L vary as the cell voltages vary from 2.8 Vdc at minimum charge to 4.2 Vdc at maximum charge. IL is now regulated, so the peak and average values of 1 L remain constant. Since the value of 1 L at maximum voltage is less than in FIG. 12, the stress and heating in L1, Q1, and Q2 will be less, and this reduces cost. The VCO used to regulate 1 L in FIG. 13B is actually less expensive than the original OL unregulated version in FIG. 10 because a separate oscillator is not required.

The two circuits in FIG. 8 and FIGS. 13A-13B are designed so that the 1 L waveform B in FIG. 9 has the same average (DC) value as 1 L in FIG. 14.

Although the peak value in FIG. 9 is much lower than FIG. 14, the switching frequency is much higher. This means QL and QH in FIG. 8 will have lower conduction losses but higher switching losses than if the VCO controller in FIG. 13A-13B was used instead. Thus there is a trade-off between FET conduction and switching losses, but switching losses are usually the higher of the two.

The disclosed BEQ has several new features which improve BEQ controller. The BEQ is more reliable due to open line protection. Two different methods of regulating the BEQ inductor current, IL, also are disclosed. This keeps IL constant as the cell voltages vary and reduces heating in various components.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A bilevel equalizer for battery voltage management comprising:
   a plurality of cells configured to be connected together to form a battery pack, the plurality of cells divided into at least first and second sections of cells;
   at least two passive equalizers, each passive equalizer connected to each of the plurality of cells in a one-to-one relationship within the at least first and second sections of cells;
   an active equalizer connected between the at least first and second sections of cells, wherein the active equalizer includes an open line protection system, wherein the open line protection system provides a connection between the bilevel equalizer and the battery pack;
   wherein the active equalizer and the open line protection system comprise a plurality of capacitors and a plurality of control circuits, and
   wherein at least one the plurality of capacitors stores energy in the event an open circuit forms to prevent voltage overload of the at least one of the plurality of control circuits.

2. The bilevel equalizer of claim 1 wherein the active equalizer comprises a first subunit and a second subunit,
   1) the first subunit comprising:
      a first subcircuit comprising a first switching device, a first inductor, and a first capacitor,
      the first subcircuit being connected in parallel to a second subcircuit,
      wherein the second subcircuit comprises the first section of cells;
   2) the second subunit comprises:
      a third subcircuit comprising a second switching device, the first inductor, and a second capacitor,
      the third subcircuit being connected in parallel to a fourth subcircuit, wherein the fourth subcircuit comprises the second section of cells; and,
wherein the first inductor is in electrical communication with the first subcircuit and the third subcircuit.

3. The bilevel equalizer of claim 1, wherein the first capacitor is connected in parallel with the first section of cells and the second capacitor is connected in parallel with the second section of cells.

4. The bilevel equalizer of claim 2, further comprising a driver that provides a drive signal to the first and second control circuits.

5. A bilevel equalizer for battery voltage management comprising:
a plurality of cells configured to be connected together to form a battery pack, the plurality of cells divided into at least first and second sections of cells;
at least two passive equalizers, each passive equalizer connected to each of the plurality of cells in a one-to-one relationship within the at least first and second sections of cells;
an active equalizer connected between the at least first and second sections of cells, wherein the active equalizer includes an open line protection system and,
a driver that provides a drive signal to the first and second control circuits;
wherein the active equalizer and the open line protection system comprise a plurality of capacitors and a plurality of control circuits, and
wherein at least one the plurality of capacitors stores energy in the event an open circuit forms to prevent voltage overload of the at least one of the plurality of control circuits;
wherein the active equalizer comprises a first subunit and a second subunit,
the first subunit comprising:
a first subcircuit comprising a first switching device, a first inductor, and a first capacitor,
the first subcircuit being connected in parallel to a second subcircuit, wherein the second subcircuit comprises the first section of cells;
the second subunit comprising:
a third subcircuit comprising a second switching device, the first inductor, and a second capacitor,
the third subcircuit being connected in parallel to a fourth subcircuit, wherein the fourth subcircuit comprises the second section of cells; and,
wherein the first inductor is in electrical communication with the first subcircuit and the third subcircuit; and,
wherein the open line protection system directs the driver to cycle on and off so that the total voltage across the capacitors is kept from exceeding the specified operating tolerances of the first and second switching devices thereby preventing voltage overload.

6. The bilevel equalizer of claim 1, wherein the control circuit comprises a field effect transistor.

7. The bilevel equalizer of claim 1, wherein the control circuits comprise a transistor and a diode element.

8. The bilevel equalizer of claim 1, further comprising a closed loop current controller,
wherein a first current is used as feedback in the closed loop current controller to provide a signal to a driver that drives the plurality of control circuits.

9. The bilevel equalizer of claim 8, wherein the closed loop current control comprises a voltage controlled oscillator (VCO).

10. The bilevel equalizer of claim 9, wherein the VCO is implemented by using a separate circuit or by adding code to an active equalizer (AEQ) microcontroller.

11. A bilevel equalizer for battery voltage management comprising:
a plurality of cells configured to be connected together to form a battery pack, the plurality of cells divided into at least two sections;
at least two passive equalizers, each passive equalizer connected to each of the plurality of cells in a one-to-one relationship within the at least two sections;
an active equalizer connected between the at least two sections, wherein the active equalizer comprises a plurality of switching devices and a first inductor having a first current;
at least one first current monitor to detect the first current; and,
a closed loop current controller;
wherein the first current is used as feedback in the closed loop current controller to provide a signal to a driver that drives the plurality of switching devices; and,
wherein the closed loop controller regulates an inductor current in the active equalizer as the section voltages vary.

12. The bilevel equalizer of claim 11, wherein the at least one current monitor is a differential pair current sensor.

13. The bilevel equalizer of claim 11, wherein the first current is compared to a reference current to calculate a difference signal and the difference signal is used to drive the driver.

14. The bilevel equalizer of claim 11, further comprising an open line protection system.

15. A bilevel equalizer for battery voltage management comprising:
a plurality of cells configured to be connected together to form a battery pack, the plurality of cells divided into at least two sections;
at least two passive equalizers, each passive equalizer connected to each of the plurality of cells in a one-to-one relationship within the at least two sections;
an active equalizer connected between the at least two sections, wherein the active equalizer comprises a plurality of switching devices and a first inductor having a first current;
at least one first current monitor to detect the first current;
a closed loop current controller wherein the first current is used as feedback in the closed loop current controller to provide a signal to a driver that drives the plurality of switching devices; and,
an open line protection system;
wherein the open line protection system further comprises a plurality of capacitors,
wherein the open line protection system further comprises a plurality of capacitors, and,
wherein at least one the plurality of capacitors stores energy in the event an open circuit forms to prevent voltage overload of at least one of the plurality of switching devices.

16. The bilevel equalizer of claim 11, wherein the switching devices comprise a transistor and a diode element.

* * * * *